United States Patent
Kingsley (10) Patent No.: US 12,440,686 B2
(45) Date of Patent: Oct. 14, 2025

(54) PIEZOELECTRICALLY-POWERED PACEMAKER USING RESPIRATORY MOTION

(71) Applicant: Piezocap, Inc., Manhasset, NY (US)

(72) Inventor: Jeffrey Kingsley, Philadelphia, PA (US)

(73) Assignee: PIEZOCAP, INC., Manhasset, NY (US)

( * ) Notice: Subject to any disclaimer, the term of this patent is extended or adjusted under 35 U.S.C. 154(b) by 480 days.

(21) Appl. No.: 17/663,502

(22) Filed: May 16, 2022

(65) Prior Publication Data
US 2022/0362566 A1  Nov. 17, 2022

Related U.S. Application Data

(60) Provisional application No. 63/188,829, filed on May 14, 2021.

(51) Int. Cl.
| | | |
|---|---|---|
| *A61N 1/00* | (2006.01) | |
| *A61N 1/375* | (2006.01) | |
| *A61N 1/378* | (2006.01) | |
| *H02N 2/18* | (2006.01) | |
| *H10N 30/30* | (2023.01) | |

(52) U.S. Cl.
CPC ....... *A61N 1/37512* (2017.08); *A61N 1/3782* (2013.01); *H02N 2/181* (2013.01); *H10N 30/308* (2023.02)

(58) Field of Classification Search
None
See application file for complete search history.

(56) References Cited

U.S. PATENT DOCUMENTS

| | | | | |
|---|---|---|---|---|
| 3,943,936 A | * | 3/1976 | Rasor | A61N 1/37205 607/128 |
| 2007/0293904 A1 | | 12/2007 | Gelbart et al. | |
| 2018/0185638 A1 | * | 7/2018 | Regnier | A61N 1/3756 |
| 2019/0028040 A1 | * | 1/2019 | Song | H02N 1/04 |
| 2019/0190405 A1 | * | 6/2019 | Okada | H02N 2/188 |

FOREIGN PATENT DOCUMENTS

| | | |
|---|---|---|
| CN | 201174668 Y | 12/2008 |
| CN | 111282154 A | 6/2020 |

OTHER PUBLICATIONS

Sezer, et al: "A comprehensive review on the state-of-the-art of piezoelectric energy harvesting", 1-25, Nano Energy, [online], Nov. 5, 2020, [Retrieved on Jun. 24, 2022], Retrieved from the Internet: <url: https://www.sciencedirect.com/science/article/pii/S2211285520311411>; p. 6; DOI: 10.1016/j.nanoen.2020.105567.

* cited by examiner

*Primary Examiner* — Sana Sahand
(74) *Attorney, Agent, or Firm* — FOX ROTHSCHILD LLP (57) ABSTRACT

A piezoelectric energy harvesting device is provided. The piezoelectric energy harvesting device includes a piezoelectric material, which includes an inner surface having a concave shape, and an outer surface having a bottom surface. The piezoelectric energy harvesting device further includes a ball positioned on the inner surface. The bottom surface acts as a ground, the inner surface acts as a positive node, and the inner surface, the outer surface, and the ball are configured so that movement of the ball causes mechanical stress to the piezoelectric material, producing an electrical current.

14 Claims, 5 Drawing Sheets

PIEZOELECTRICALLY-POWERED PACEMAKER USING RESPIRATORY MOTION

CROSS-REFERENCE TO RELATED APPLICATION

The present application claims priority to U.S. Provisional Patent Application No. 63/188,829, filed May 14, 2022, entitled "PIEZOELECTRICALLY-POWERED PACEMAKER USING RESPIRATORY MOTION," the contents of with are herein incorporated by reference in their entirety.

BACKGROUND

The number of patients requiring a new pacemaker or Implantable Cardioverter-Defibrillator (ICD) increased 55.6% from 1993-2009, and continues to increase, with an estimated 1.43 million implanted pacemaker devices expected by 2023. Despite advancements in pacemaker technology over this time, pacemaker functionality remains limited by the lifetime of the pacemaker's battery, which is dependent on several variables including, for example, baseline battery self-discharge, current drain for device housekeeping functions, current requirement for pacing the heart, and current used to sense the underlying heart rhythm.

An average pacemaker battery has approximately 0.5-2 Ah of battery life, which lasts from approximately 7-10 years, depending on the individual pacing requirement of the heart. The complication rate associated with the device replacement procedure varies from 4% to 15.3%, depending on the complexity of the procedure and the potential need for lead replacement or upgrade.

Potential complications include, but are not limited to, infection, bleeding, generator or lead malfunction requiring reoperation, prolonged hospital stay, hospital readmission, nerve injury, vessel injury, and death. Together, these complications account for an estimated $37,000 in healthcare costs per procedure for a total of over 2 billion dollars in annual healthcare costs in the United States. Thus, there exists a need to improve pacemaker battery life or develop a battery-free pacemaker to reduce the associated healthcare financial burden and improve patient outcomes.

Implantable energy harvesting technology provides a promising solution to eliminate the need for a battery by utilizing ambient sources of energy naturally produced by the body. Energy harvesting can be defined as the direct transformation of ambient energy to electrical energy using a unique material or transduction mechanism. Several potential ambient energy sources have been proposed, including biochemical, electrostatic, thermal, electromagnetic, inductive, and kinetic energy. However, these sources of energy are often limited due to their unpredictable nature and inadequate energy production. Recently, capturing the kinetic energy produced by cardiac and respiratory motion has been explored due to its inexhaustive repetitive nature and associated power output of 1.4 watts (W) and 0.83 watts, respectively, which far exceeds the requirement needed to power the functions of a pacemaker. However, the current energy harvesting devices which utilize cardiac kinetic motion are limited, since these devices require an additional invasive procedure for implantation.

For at least these reasons, an efficient and less invasion means of powering pacemakers using harvested energy is needed.

SUMMARY

According to an aspect of the present disclosure, a piezoelectric energy harvesting device is provided. The piezoelectric energy harvesting device includes a piezoelectric material, which includes an inner surface having a concave shape, and an outer surface having a bottom surface. The piezoelectric energy harvesting device further includes a ball positioned on the inner surface. The bottom surface acts as a ground, the inner surface acts as a positive node, and the inner surface, the outer surface, and the ball are configured so that movement of the ball causes mechanical stress to the piezoelectric material, producing an electrical current.

According to various embodiments, the piezoelectric material is configured to fit within a 50 mm×45 mm×7 mm area.

According to various embodiments, the piezoelectric energy harvesting device further includes one or more electrodes positioned on the piezoelectric material, configured to capture an output current generated by the piezoelectric material.

According to various embodiments, the one or more electrodes are coupled to the bottom surface of the outer surface.

According to various embodiments, the one or more electrodes are coupled to the inner surface.

According to various embodiments, the piezoelectric energy harvesting device further includes an AC/DC rectifier circuit and a voltage regulator/converter, wherein the AC/DC rectifier circuit is followed by the voltage regulator/converter.

According to various embodiments, the piezoelectric material includes one or more of the following: PZT-5H ceramic, Polyvinylidene fluoride (PVDF) polymer film, zinc oxide (ZnO), aluminum nitride (AlN), and) zirconate-titanate/poly-dimethylsiloxane (PZT-PDMS).

According to various embodiments, the ball is a metal ball.

According to various embodiments, the metal ball includes steel.

According to various embodiments, the piezoelectric material has a cylindrical outer surface.

According to various embodiments, the piezoelectric material is configured to output at least 5V.

According to various embodiments, the piezoelectric material is configured to be housed within a pacemaker housing, and the piezoelectric material is configured to power one or more components of a pacemaker.

According to various embodiments, the concave shape is a hemisphere.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

According to various embodiments, a novel approach to powering a pacemaker using a piezoelectric energy harvesting device is provided which is sustained within an existing pacemaker housing and is capable of capturing biomechanical energy associated with respiratory motion to power an implantable pacemaker and eliminate the need for end-of-life device procedures. While powering a pacemaker is described, it is noted, however, that the piezoelectric energy harvesting device may be configured to have other applications such as, for example, applications to power other suitable battery-powered or non-battery-powered devices. These other applications may include, e.g., applications in the inplantable device industry (e.g., implantable cardioverter-defibrillators (ICDs), leadless pacemakers, medication infusion pumps, neurostimulator devices, etc.), applications in the wearable consumer electronics industry (e.g., smart watches, fitness trackers, wireless headphones, etc.), applications in the low-power consumer electronics industry (e.g., cell phones, computer tablets, laptop computers, etc.), applications in the electric vehicle industry (e.g., electric vehicle battery recharging, etc.), and/or other suitable industries.

Figures 1A, 1B:
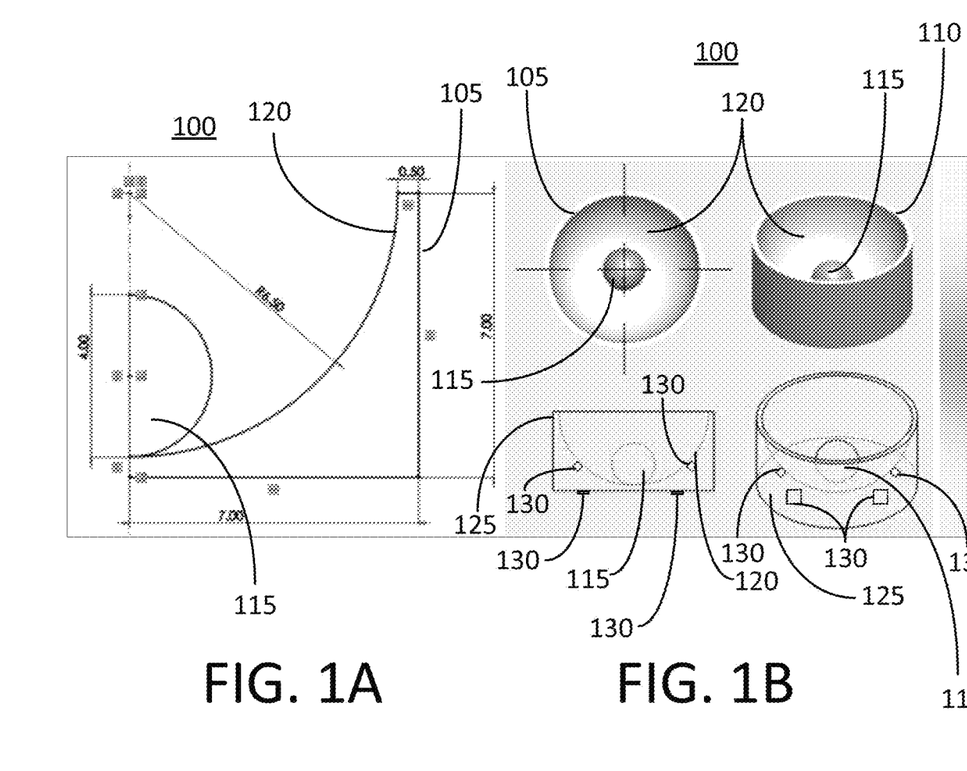
FIGS. 1A-1C illustrate an energy harvesting device for powering a pacemaker, in accordance with various embodiments of the present disclosure.
Figure 1C:
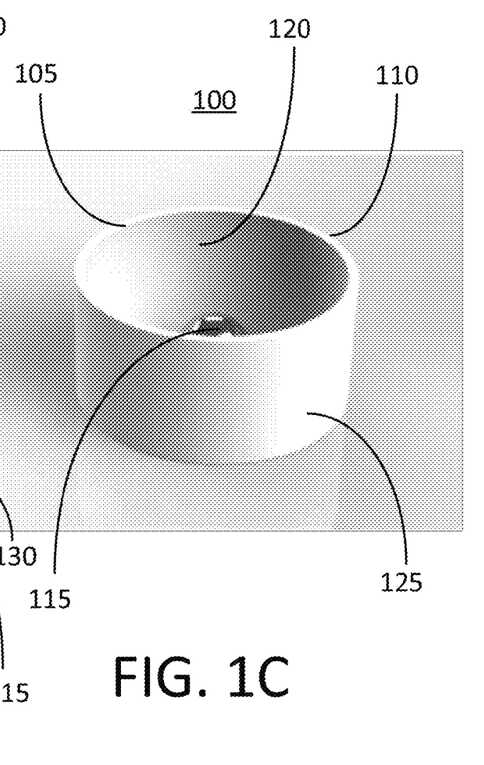

Referring now to FIGS. 1A-1C, an energy harvesting device 100 for powering a pacemaker is illustratively depicted, in accordance with various embodiments of the present disclosure.

According to various embodiments, to prevent the need for additional invasive procedures during the pacemaker implantation process, the energy harvesting device 100 has dimensions which configured the energy harvesting device 100 to fit within an area of approximately 50 mm×45 mm×7 mm, which correlates with the average size of a pacemaker housing/shell. It is noted, however, that, according to various embodiments of the present disclosure, the energy harvesting device 100 may have other suitable dimensions, while maintaining the spirit and functionality of the present disclosure.

According to various embodiments, the energy output from the energy harvesting device 100 may be configured to consistently produce approximately a 5V output using kinetic motion generated from respiratory motion in order to perform the requirements of a pacemaker battery. Although most pacemakers typically operate using approximately 2-3V, a threshold target of 5V was chosen to allow for full pacemaker functionality in all cardiac tissue substrates and account for process variation and fatigue which may unexpectedly reduce voltage output. It is noted, however, that, according to various embodiments, the energy harvesting device 100 may be configured to produce other suitable voltages in order to power a suitable pacemaker or other suitable device. For example, according to some embodiments, the energy output from the energy harvesting device 100 may be configured to produce fewer than 5V, and according to some embodiments, the energy output from the energy harvesting device 100 may be configured to produce greater than 5V. In some embodiments, the energy output from the energy harvesting device 100 may be configured to fluctuate in its produced output voltage.

Pacemakers are generally designed to function during the remaining duration of the patient's life. In order to prevent the need for further medical procedures to replace pacemaker batteries, the power output from the energy harvesting device 100 is configured to sustain power generation for the remainder of the patient's life and/or until the pacemaker is no longer needed. Additionally, the energy harvesting device 100 may be configured not to produce electromagnetic interference, which may interfere with one or more functions of the pacemaker and/or one or more other implanted devices.

According to various embodiments, the energy harvesting device 100 is configured to provide for ease of implantation, a decrease in material cost, and an increase in manufacturability.

According to various embodiments, the energy harvesting device 100 incorporates one or more piezoelectric (PZT) materials. PZT materials are unique in their ability to produce an electrical current when placed under a mechanical stress. PZT materials offer the advantages of inherent transduction capacity, the preservation of efficiency with reduced scale, the capacity to function in a large range of frequencies, and provide a higher power density compared to electromagnetic and electrostatic transducers. The most common piezoelectric material is perovskite lead zirconate titanate, which is a polycrystalline monolithic piezoelectric ceramic. PZT ceramics provide the benefits of affordability, ease of manufacturing, and a high coupling coefficient, which results in increased power output efficiency.

Disadvantages of PZT ceramics include the brittle nature of the ceramic material as well as the inclusion of lead which may have toxic side effects. However, the brittle nature of PZT ceramics does not impact long term function of the design, since the energy harvesting device 100 is configured, according to various embodiments, to be enclosed within a pacemaker housing, and is therefore protected from outside extraneous forces. The design of the energy harvesting device 100 within the pacemaker housing also limits any potential toxicity effects from lead-based PZT materials. Toxicity would therefore require erosion of the housing or a defective housing, which occurs at a rate of approximately 1%.

Additionally, there exists several lead-free PZT materials, natural minerals, and polymers which are chemically inert to the human body. Recently, a flexible three dimensional (3D) zirconate-titanate/poly-dimethylsiloxane (PZT-PDMS) polymer composite microform foam structure was developed, which has polymer-like flexibility and high piezoelectric sensitivity, resulting in a nearly 10-fold increase in the ability to harvest energy associated with mechanical deformations, due to improved strain-transfer capability. Additionally, the load transfer efficiency of 3D interconnected ceramic structures can reach >50%, which is several magnitudes higher than traditional PZT materials, which is of considerable interest given the implications of the energy harvesting device 100 design. Each form of PZT material (e.g., ceramic, natural mineral, polymer, and PZT-PDMS foam composite) was analyzed to determine an optimal material for the piezoelectric energy harvesting device 100.

According to various embodiments, the PZT energy harvesting device 100 was designed with the goal to optimize energy output with respiratory motion in addition to other movements such as, e.g., walking, positional changes, and/or other sources of vibrational energy. In order to most efficiently capture the vibrational energy associated with the translational changes of these movements, a 3D design of the energy harvesting device 100 was utilized, as shown in FIGS. 1A-IC. The 3D design allows for the benefit of capturing the energy associated with movements in all potential planes of motion.

Additionally, the 3D model was designed according to the aforementioned design constraints of material cost, ease of implantation, and manufacturability. With these considerations in mind, a piezoelectric (PZT) cylindrical shape 105 with a cylindrical outer surface and a concave-shaped inner surface 120 of the PZT material 110 was determined to be the optimal shape to most efficiently capture the translational movement associated with respiratory motion in all coordinate planes. According to some embodiments, the concave-shaped inner surface 120 is hemisphere-shaped. Since the PZT cylindrical shape 120 will be fixed to an internal housing of a pacemaker, a ball 115 (e.g., a metal ball, such as, e.g., a steel ball, tungsten ball, other suitable metal ball, and/or a ball including a combination of metals and/or metals and non-metals) is placed on the concave inner surface 120 of the PZT cylindrical shape 105. It is noted, however, that other suitable surface shapes and/or structures such as, but not limited to, curved surfaces and concave surfaces, among others, may be used while maintaining the spirit and functionality of the present disclosure.

As shown in FIGS. 1A-1C, initial proposed model dimensions for the steel ball 115 and the cylindrical shape 105 of the PZT material 110 (including the inner concave shape 120), based on existing pacemaker housing dimensions (FIG. 1A, a 3D model showing multiple views of the PZT energy harvesting device 100 (FIG. 1B), and a rendering of the PZT energy harvesting device 100 with the PZT 110 inner concave shape 120 and the steel ball 115 in the center of the concave inner surface 120 of the PZT cylindrical shape 105 (FIG. 1C) are illustratively depicted.

According to various embodiments, essentially all forms of movement of the PZT energy harvesting device 100 will be translated to the steel ball 120, which can freely rotate within the PZT 110 inner concave shape 120. As the steel ball 115 rotates and oscillates within the PZT 110 inner concave shape 120, a corresponding normal force between the steel ball 115 and the internal concave surface 120 of the PZT 110 cylindrical shape 105 provides the necessary mechanical stress on the PZT material 110 for the energy harvesting device 100 to produce an electrical charge.

Figure 2:
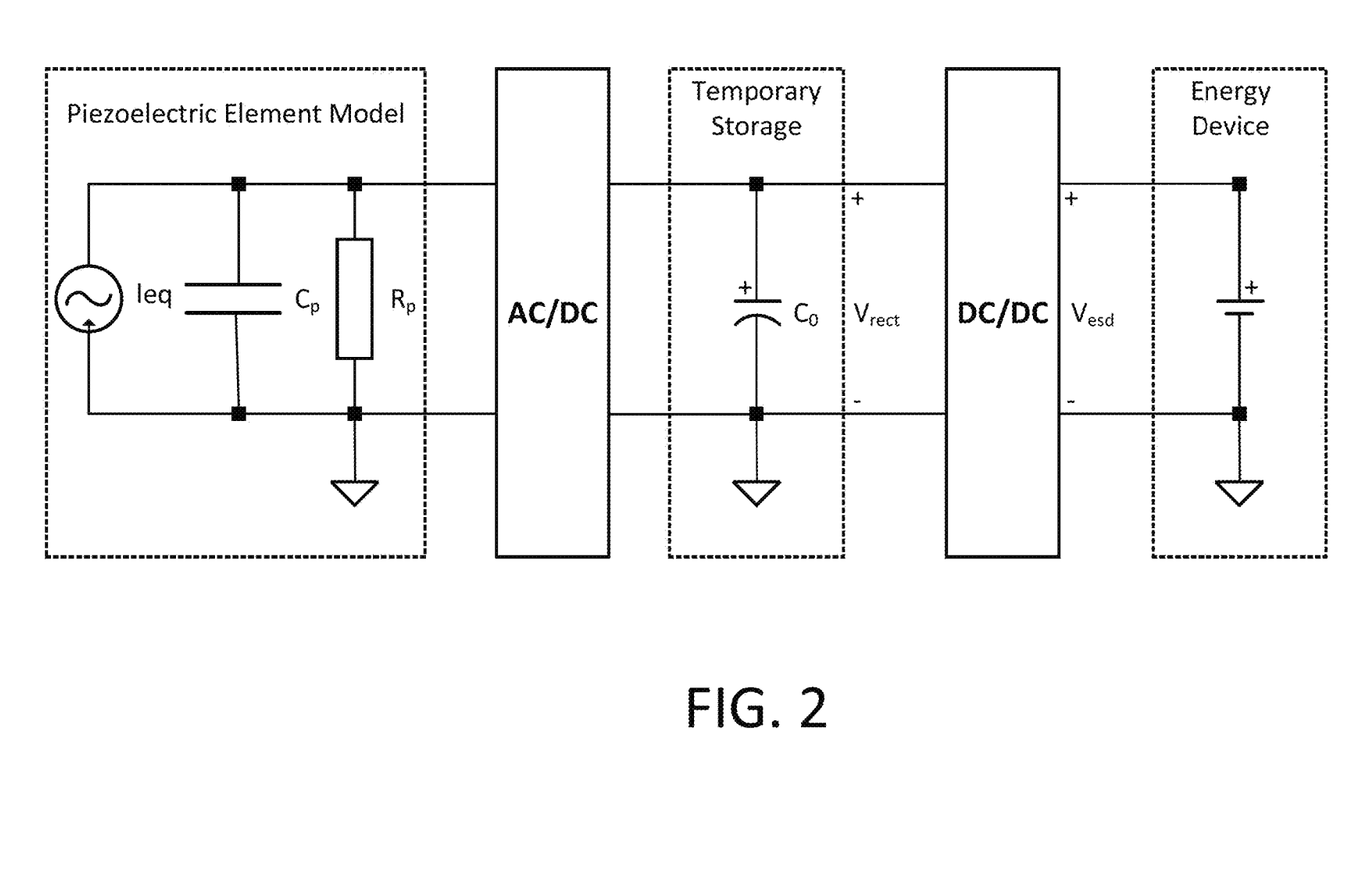
FIG. 2 illustrates electrical components of two-stage piezoelectric harvesting circuit for use with an energy harvesting device, in accordance with various embodiments of the present disclosure.

The device of the energy harvesting device 100 was designed with the bottom outer surface 125 of the PZT cylindrical shape 105 as a ground, with the inner piezoelectric concave surface 120 acting as the positive node, as shown in FIG. 2. According to various embodiments, electrodes 130 are placed on and/or coupled to the bottom outer surface 125 and/or at the inner concave surface 120 to capture the voltage gradient generated from the energy harvesting device.

Referring now to FIG. 2, a two-stage piezoelectric energy harvesting circuit is illustratively depicted, in accordance with various embodiments of the present disclosure.

As shown in FIG. 2, the output current is connected to a circuit with an AC/DC rectifier circuit followed by a voltage regulator/converter (e.g., a DC/DC step-down converter) with the final energy stored in a capacitor to discharge to the battery or pacemaker leads.

According to various embodiments, a traditional AC/DC diode-resistor pair rectifier may be replaced with a synchronous rectifier which, e.g., uses an actively-controlled switching element, such as a MOSFET transistor. Such a replacement may produce an approximately 300% increase in efficiency. According to various embodiments, if the output voltage from the piezoelectric generator is too low, a boost converter (e.g., a step-up converter) may be used to proportionally step up the voltage at the expense of decreasing current output. According to various embodiments, precharging the circuit may increase power output, resulting in up to an approximately 43% increase in power output compared to non-precharging.

According to various embodiments, considering that the inner concave shape 120 must provide free space for ball movements of the steel ball 115 that originate from respiratory motions, an additional design constraint is introduced with 2r<R, where R is the radius of the inner concave surface 120 and r is the radius of the steel ball 115. Variations in PZT material 110, diameter of the steel ball 115, and diameter of the PZT inner concave shape 120 were created per the pacemaker housing design constraints. A 3 mm craniocaudal translation in the pacemaker implant site may be expected with changes in respiratory motion during tidal volume breathing. Sample average chest wall displacements during tidal breathing are shown, e.g., in Table 1.

TABLE 1

Average chest wall displacements during tidal breathing

| | | Craniocaudal Motion | | Laterolateral Motion | | Dorsoventral Motion | |
| --- | --- | --- | --- | --- | --- | --- | --- |
| Rib cage | n | Mean, mm | d, e, f | Mean, mm | d, e, f | Mean, mm | d, e, f |
| Sternum (15) | 55 | 3.71$^c$ | 5, 0, 0 | −0.11$^c$ | | 4.33$^c$ | 5, 0, 0 |
| Ventral part (14, 16) | 74 | 3.15$^c$ | 5, 0, 0 | 0.97$^c$ | 5, 0, 0 | 4.23$^c$ | 5, 0, 0 |
| Lateral part (13, 17) | 50 | 2.15$^c$ | 5, 0, 0 | 1.21$^c$ | 4, 1, 0 | 2.96$^c$ | 4, 1, 0 |
| Dorsal part (18, 20) | 75 | 0.68$^c$ | 4, 1, 0 | 0.97$^c$ | 4, 1, 0 | 1.71$^c$ | 5, 0, 0 |

Simulations were completed using the 3 mm translation of the steel ball 115 along the inner PZT concave surface 120 with the goal to produce consistent energy output from respiratory motion which meets the 5V requirement to indefinitely sustain pacemaker functionality.

For preliminary verification on the energy harvesting device 100 design, a dynamic finite element model was used to evaluate the performance of the piezoelectric energy harvesting device 100. The model was created using the assumption of linear elastic and linear piezoelectric constitutive relations for the piezoelectric energy harvesting device 100 PZT material 110 and the steel ball 115. Undergoing finite element analysis, a simulation of the dynamic voltage output associated with respiratory motion was generated (as shown in FIG. 3D). The dynamic simulation was created based on the initial 3 mm craniocaudal displacement of the ball expected with tidal volume respiration.

Gravitational force caused the steel ball 115 to roll down the inner concave surface 120 of the PZT cylindrical shape 105 and oscillate with additional respiratory efforts. As the steel ball 115 rolled down the inner concave surface 120 of the PZT cylindrical shape 105, the normal force generates a corresponding stress field and voltage field in the energy harvesting device 100, thus translating mechanical energy into electrical energy (as shown in FIGS. 2B-2C). The model achieved a peak voltage of 18V and exceeded the pacemaker battery charge threshold of 5V during 52% time of a respiratory cycle (FIG. 3D). Additionally, a steel ball 115 dropping simulation was completed with an initial height of 3 mm, which achieved a peak voltage of greater than 30V (FIG. 3E) during the impact. The simulation results demonstrated that the energy harvesting device 100 is able to efficiently and consistently utilize respiratory motion to meet the power output needs of a pacemaker device.

Figure 3A:
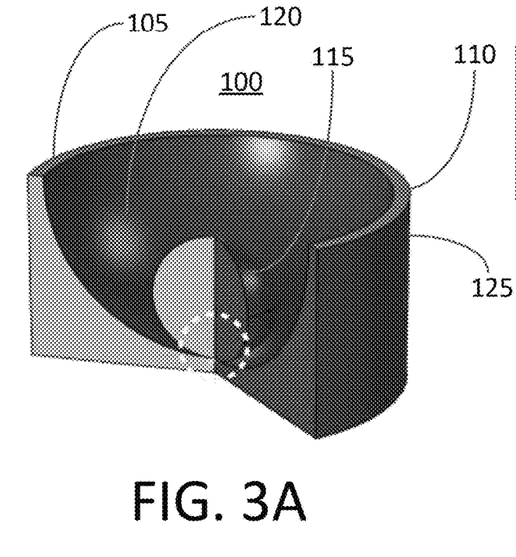
FIGS. 3A-3E, illustrate a finite element simulation of a piezoelectric energy harvester, in accordance with various embodiments of the present disclosure.
Figure 3B:
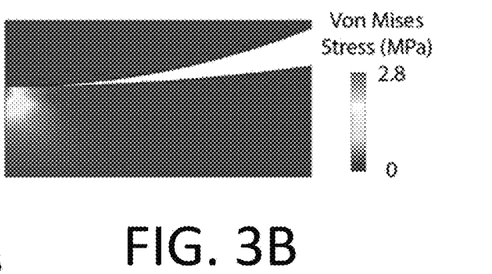
Figure 3C:
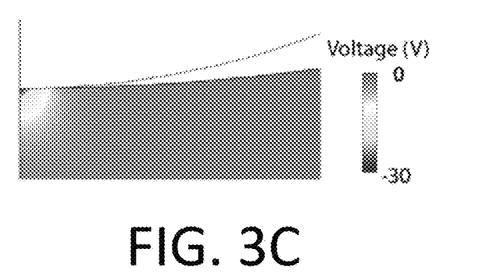
Figure 3D:
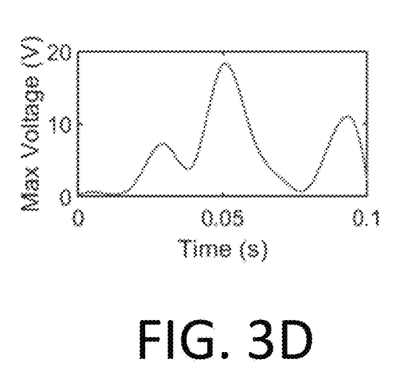
Figure 3E:
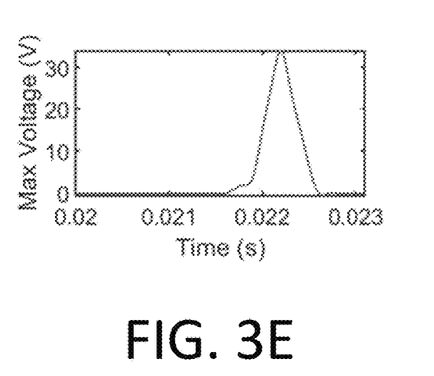

As shown in FIGS. 3A-3E, a finite element simulation of the PZT energy harvesting device 100 is illustratively depicted. In FIG. 3A, the geometry of the concave-shaped surface 120 and the steel ball 115 resting on the bottom of the inner concave surface 120 of the PZT cylindrical shape 105 is shown. In FIGS. 3B-3C, the Von Mises stress and piezoelectric voltage distribution near the contact point are shown. In FIG. 3D, the voltage response during one repository cycle (0.1 s) is shown. The piezoelectric voltage is generated by the supporting force of dynamic rolling.

For material optimization in the model, several piezoelectric materials 110 were analyzed which meet the secondary design constraints of material cost and manufacturability. The PZT materials 110 analyzed include, but are not limited to, PZT-5H ceramic, Polyvinylidene fluoride (PVDF) polymer film, zinc oxide (ZnO), and aluminum nitride (AlN). It is noted, however, that other suitable PZT materials 110 may be used, while maintaining the spirit and functionality of the present disclosure.

To estimate power output, the dynamic rolling process was modeled as a static simulation based on the voltage output at the apex of the concave curve generated by the supporting normal force. The voltage response for different piezoelectric materials is listed in Table 2, which shows a maximum expected voltage output of 14.51V using a PVDF film, with the PZT-5H ceramic producing 7.31V.

TABLE 2

Static Finite Element Model Analysis of Voltage Output Based on PZT Material

| Material | Voltage Output (V) |
| --- | --- |
| PZT-5H Ceramic | 7.31 |
| PVDF Film | 14.51 |
| Zinc Oxide (ZnO) | 5.83 |
| Aluminum Nitride (AlN) | 1.72 |

Due to variations in porosity of the PZT-PDMS composite material, an additional scaling finite element analysis model based on composite theories was completed to determine the optimal volume ratio ($\alpha$) and inner surface radius (R) to maximize power output.

Figure 4A:
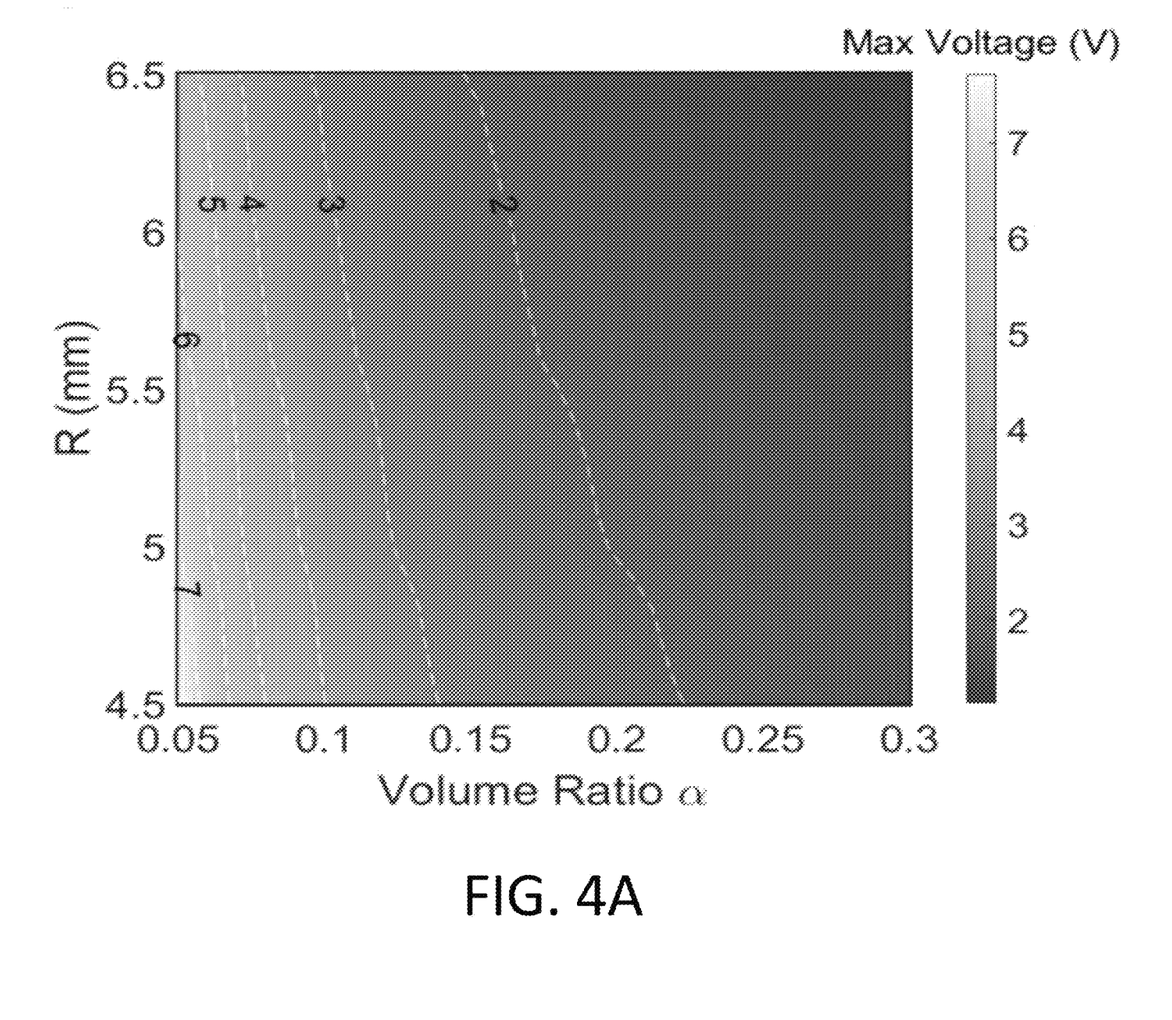
FIGS. 4A-4B illustratively depict an optimization result regarding volume ratio α, inner surface radius R, and ball radius r, in accordance with various embodiments of the present disclosure.
Figure 4B:
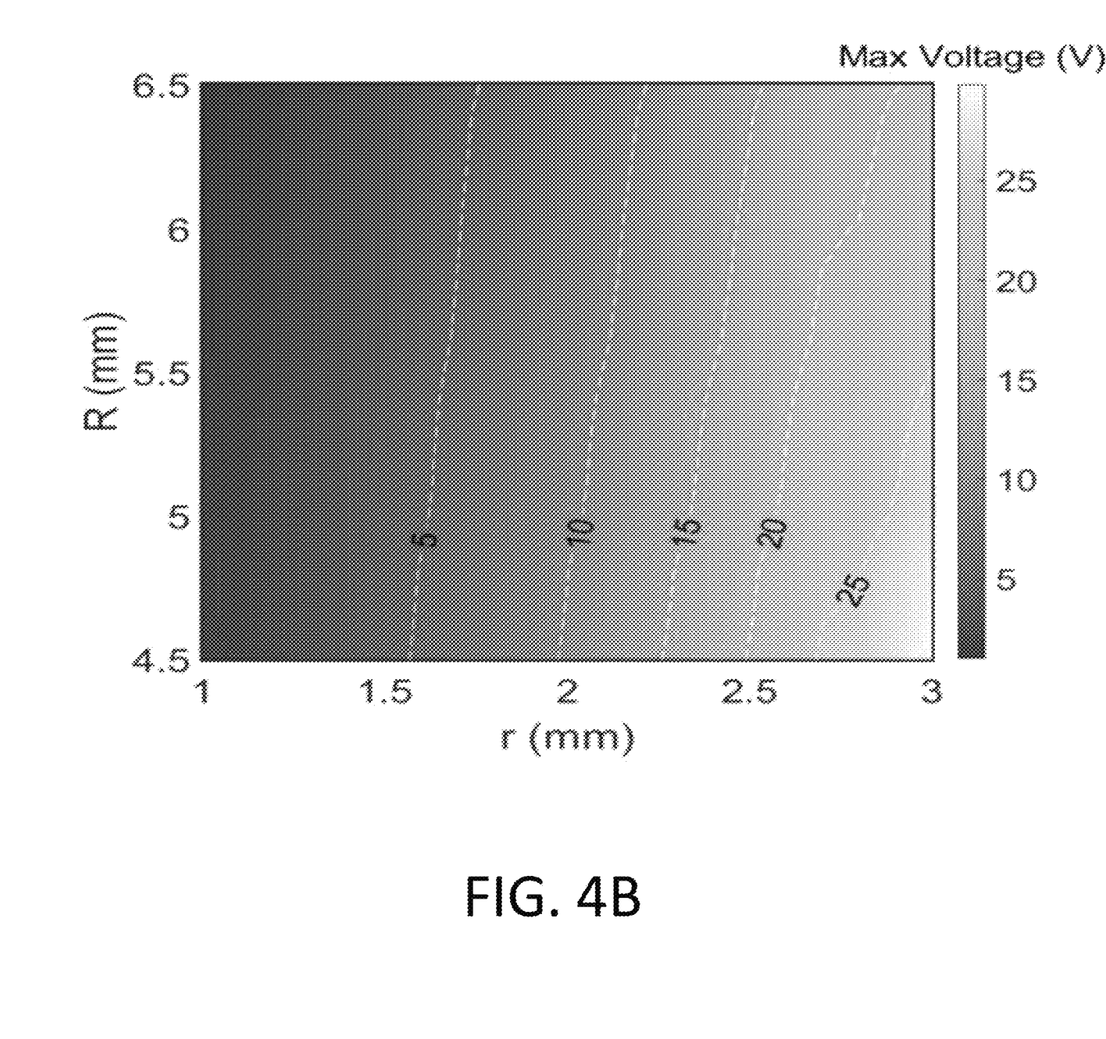

As shown in FIGS. 4A-4B, an optimization result regarding volume ratio $\alpha$, inner surface radius R, and ball radius r is illustratively depicted. In FIG. 4A, the map denotes maximum voltage output and, in FIG. 4B, the output voltage distribution regarding R and $\alpha$, fixing r=2 mm is depicted. According to various embodiments, the output voltage distribution regarding R and r, fixing $\alpha$=0.1.

FIG. 4A demonstrates the inverse relationship of output voltage with both volume ratio and inner surface radius with the PZT-PDMS material. Maximum voltage output was achieved with an inner surface radius of 4.5 mm and volume ratio of 0.05 relative to a fixed steel ball radius of 2 mm. Similarly, FIG. 4b illustrates that the output voltage monotonically increases with the steel ball radius (r). The optimization results suggest that, for the PZT-PDMS material, the optimal device design to achieve maximum voltages involves a 3 mm steel ball 115 within a 4.5 mm PZT concave surface 120 with a volume ratio or PZT porosity of 0.05. Overall, the optimization results not only provide qualitative design criterion for the manufacturing of the energy harvesting device, but also demonstrate the ability to consistently produce adequate voltage output necessary to sustain pacemaker functionality.

The proposed PZT energy harvesting device 100 has demonstrated the ability to produce a permanent, autonomous power source by capturing the energy associated with respiratory motion which does not require replacement or maintenance associated with traditional pacemaker technology. The optimized model of the energy harvesting device 100 was successful in achieving the target 5V threshold for 52% of the respiratory cycle which ensures full pacemaker functionality, while also surpassing the 30 µW power requirement necessary to provide continuous pacing therapy. Although the PZT model was developed based on the translational movement associated with respiratory motion, the energy output from the device is expected to increase substantially with larger movements such as, e.g., positional changes, walking, or running.

Based on the voltage and power output generated by the current design of the energy harvesting device 100, the technology may have additional applications in the implantable device industry with improvement in device longevity for ICDs, leadless pacemakers, medication infusion pumps, and neurostimulator devices. Future analysis is warranted to assess the potential of the proposed PZT energy harvesting device 100 in additional implantable devices therapies. Ongoing studies are currently being completed to assess for biocompatibility, device longevity, and electromagnetic interference.

Overall, the elimination of additional invasive procedures during pacemaker replacement and end of life maintenance will not only drastically decrease the $2 billion annual Medicare costs associated with the complications of these pacemaker procedures, but will more importantly result in improved patient outcomes. The average complication rate from these procedures varies from 4-15.3%, thus eliminating the need for these procedures altogether prevents any patient-specific complications such as infection, bleeding, nerve injury, vessel injury, or death. Additionally, utilizing the novel design of the PZT energy harvesting device 100 within an existing pacemaker housing, the device does not increase intraoperative time during implantation or require any additional invasive procedures. Eliminating the battery component of pacemaker technology also significantly decreases total device size, thus decreasing the associated incision site size and pacemaker pocket volume. These reductions not only improve ease of implantation but could also potentially further reduce infection risk by decreasing the surface area for adherence of bacteria and host inflammatory response.

Due to the improvements in patient outcomes and healthcare delivery, the proposed PZT energy harvesting device 100 offers an unprecedented engineering solution to address the power supply challenges for the next generation of pacemakers while providing a more efficient, safe method to deliver implantable device therapy.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The invention claimed is:

1. A piezoelectric energy harvesting device, comprising:
  a piezoelectric material, wherein the piezoelectric material includes:
    an inner surface having a concave shape, and
    an outer surface having a bottom surface;
  a ball positioned on the inner surface, wherein:
    the bottom surface acts as a ground,
    the inner surface acts as a positive node,
    the inner surface, the outer surface, and the ball are configured to capture biomechanical energy associated with respiratory motion to cause movement of the ball, and
    the movement causes mechanical stress to the piezoelectric material to produce an electrical current.

2. The piezoelectric energy harvesting device of claim 1, wherein the piezoelectric material is configured to fit within a 50 mm×45 mm×7 mm area.

3. The piezoelectric energy harvesting device of claim 1, further comprising one or more electrodes positioned on the piezoelectric material, configured to capture an output current generated by the piezoelectric material.

4. The piezoelectric energy harvesting device of claim 3, wherein the one or more electrodes are coupled to the bottom surface of the outer surface.

5. The piezoelectric energy harvesting device of claim 3, wherein the one or more electrodes are coupled to the inner surface.

6. The piezoelectric energy harvesting device of claim 3, further comprising an AC/DC rectifier circuit and a voltage regulator/converter, wherein the AC/DC rectifier circuit is followed by the voltage regulator/converter.

7. The piezoelectric energy harvesting device of claim 1, wherein the piezoelectric material includes one or more of the following: PZT-5H ceramic, Polyvinylidene fluoride (PVDF) polymer film, zinc oxide (ZnO), aluminum nitride (AlN), and zirconate-titanate/poly-dimethylsiloxane (PZT-PDMS).

8. The piezoelectric energy harvesting device of claim 1, wherein the ball is a metal ball.

9. The piezoelectric energy harvesting device of claim 8, wherein the metal ball includes steel.

10. The piezoelectric energy harvesting device of claim 1, wherein the piezoelectric material has a cylindrical outer surface.

11. The piezoelectric energy harvesting device of claim 1, wherein the piezoelectric material is configured to output at least 5V.

12. The piezoelectric energy harvesting device of claim 1, wherein:
  the piezoelectric material is configured to be housed within a pacemaker housing; and
  the piezoelectric material is configured to power one or more components of a pacemaker.

13. The piezoelectric energy harvesting device of claim 1, wherein the concave shape is a hemisphere.

14. The piezoelectric energy harvesting device of claim 1, wherein a first radius associated with the inner surface is greater than a first diameter of the ball.

* * * * *